(12) United States Patent
Hauet

(10) Patent No.: US 6,799,077 B1
(45) Date of Patent: Sep. 28, 2004

(54) COMMUNICATIONS ARCHITECTURE FOR PROCESS CONTROL SYSTEM

(75) Inventor: Jean-Pierre Hauet, Rueil-Malmaison (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/509,298

(22) PCT Filed: Jul. 21, 1999

(86) PCT No.: PCT/FR99/01797
§ 371 (c)(1),
(2), (4) Date: Mar. 21, 2000

(87) PCT Pub. No.: WO00/05632
PCT Pub. Date: Feb. 3, 2000

(30) Foreign Application Priority Data
Jul. 22, 1998 (FR) .......................... 98 09381

(51) Int. Cl.$^7$ ................. G05B 19/18; G05B 19/418
(52) U.S. Cl. ................. 700/2; 370/459; 709/232; 709/249; 700/96
(58) Field of Search .................... 700/95, 83, 2, 700/19, 17, 180, 282, 231, 197, 96, 9; 709/203, 217, 219, 250, 232, 249; 345/733; 370/222, 458–461

(56) References Cited

U.S. PATENT DOCUMENTS 5,706,278 A * 1/1998 Robillard et al. ............ 370/222
6,085,227 A * 7/2000 Edlund et al. ............... 709/203
6,311,101 B1 * 10/2001 Kastner ....................... 700/197
6,321,272 B1 * 11/2001 Swales ........................ 709/250
6,360,137 B1 * 3/2002 Royal et al. ................. 700/231
6,370,448 B1 * 4/2002 Eryurek ....................... 700/282
6,484,061 B2 * 11/2002 Papadopoulos et al. ....... 700/83

FOREIGN PATENT DOCUMENTS

| DE | 197 04 694 A1 | 8/1997 |
| DE | 196 15 190 A1 | 10/1997 |
| EP | 0 822 498 A1 | 2/1998 |
| EP | 0 838 768 A2 | 4/1998 |

* cited by examiner

Primary Examiner—Leo Picard
Assistant Examiner—Steven R. Garland
(74) Attorney, Agent, or Firm—Sughrue Mion, PLLC

(57) ABSTRACT

A time-shared communications architecture for communicating digitized information for an industrial process control system, which architecture includes various programmed operating units (8, 10, 11) in particular site units (8) situated at a process interface level, which units process and store information which can be accessed by at least one other unit internal to the system or by an external computer, via at least one industrial local area network of said communications architecture. At least some of the units contain servers (9) of the HTTP type so as to be capable of sending optionally interactive computer documents in response to requests received from another unit of the system or from a computer, in particular external to the system, equipped with an HTTP/TCP/IP protocol stack and acting as a customer, without disturbing the priority and deterministic interchange related to the real time control of the process.

14 Claims, 3 Drawing Sheets

COMMUNICATIONS ARCHITECTURE FOR PROCESS CONTROL SYSTEM

BACKGROUND OF THE INVENTION

The invention relates to information communications architecture designed more particularly to be installed in an industrial process control system so as to enable digitized information to be transmitted in time shared manner between programmed operating units of the system.

As is known, managing an industrial process control system involves the presence of communications architecture in order to transmit information between the various programmed operating units that can act in the control of the process, so that the information is transmitted in a manner well suited to the various needs encountered. Such an architecture is commonly made up of one or more "industrial" local area networks organized around one or more bus-type links.

It is conventional in such systems to use the links in time shared manner for transmitting information between the programmed operating units. It is common in the field of industrial process control to have very strict transmission constraints for certain information. That involves implementing "deterministic" local area networks which are organized to make it possible to comply with the time constraints for transmitting information for which such constraints are necessary, i.e. which convey information within a determined time limit, or which aim to achieve such a result.

It is then known to enable information whose transmission is subject only to relatively flexible constraints in terms of urgency to make use of the lapses of time that are left available on a more or less regular basis by the priority information which is subject to constraints that are more severe.

In many operating cases, it is advantageous to be able to access, at will and without there necessarily being any urgency, information contained in a memory of any one of the programmed operating units of a system, e.g. by means of another programmed unit or of a computer, via the communications architecture of the system, and regardless of the location of said other unit or of said computer relative to the system.

In particular, when the operation of a system involves a wide variety of equipment involving various users taking action that is not necessarily plannable, it is advantageous for those users to be able to access easily the information that they need, via the communications architecture of the system, and optionally from the outside, whenever such information is stored accessibly by a programmed operating unit of the system.

Such access must preferably be possible for users who can differ widely. One known system thus makes provision to use a communications architecture that uses an information access technique that is implemented more particularly in the context of the Internet.

For that purpose, the information that is available in the programmed operating units and in particular the information that has been collected via the communications architecture of the system, is inserted into HTML pages installed in a programmed operating unit of the system that is constituted by a dedicated computer in which an HTTP server is installed. That computer is, for example, connected to an external network 0 which uses the Internet techniques, or even to the Internet itself. Any user who has access to a suitably-equipped computer assumed, in that example, to be connected to the network 0, or who has access to a functionally-equivalent programmed unit of the system, can then become acquainted with the information contained in the HTML pages, stored in the dedicated computer.

However, that solution is not entirely satisfactory in particular as regards how up-to-date the stored information is. Unfortunately, that can be crucial in a system in which certain items of equipment and in particular certain site units are used in real time and must not be disturbed during the control of the process.

SUMMARY OF THE INVENTION

The invention therefore provides a time-shared communications architecture for communicating digitized information for an industrial process control system, which architecture is organized around at least one industrial local area network conveying deterministic traffic between various programmed operating units, which units process and store information which can be accessed by at least one other programmed operating unit via said architecture.

According to a characteristic of the invention, said architecture includes various programmed operating units in particular comprising units situated at an intermediate level or at a process interface level or at a site monitoring/control device level, which units individually include servers of the HTTP type so as to be capable of sending optionally interactive computer documents in response to requests received from another unit of the system or from a computer, in particular external to the system, equipped with an HTTP/TCP/IP protocol stack and acting as a customer, in the context of messaging traffic making use of the transmission possibilities constituted by the time slots left available by the deterministic traffic of the industrial local area network(s) of the system, without disturbing the priority and deterministic interchange related to the real time control of the process.

According to another characteristic of the invention the architecture is constituted in a manner such that units are organized in one or more clusters around at least one industrial local area network of the site bus type which is specific to a cluster and which connects the units of the cluster to at least one shared unit, optionally serving as a gateway or as a router to another industrial local area network serving at least one other programmed unit of a higher level of the architecture, in particular a supervision unit and/or optionally a unit serving as a gateway or router to an external communications network, so that the HTTP server of a cluster unit equipped with such a server responds with an optionally interactive computer document if a request is addressed to it, via at least one of the networks, by another unit or by a computer, in particular external to the system, equipped with an HTTP/TCP/IP protocol stack, when the request concerns inserting or extracting parameters and/or variables stored at the unit that includes said server.

BRIEF DESCRIPTION OF THE DRAWINGS

The invention, its characteristics, and its advantages appear more clearly from the following description given with reference to the following list of figures, in which.

DETAILED DESCRIPTION OF THE INVENTION

Figure 1:
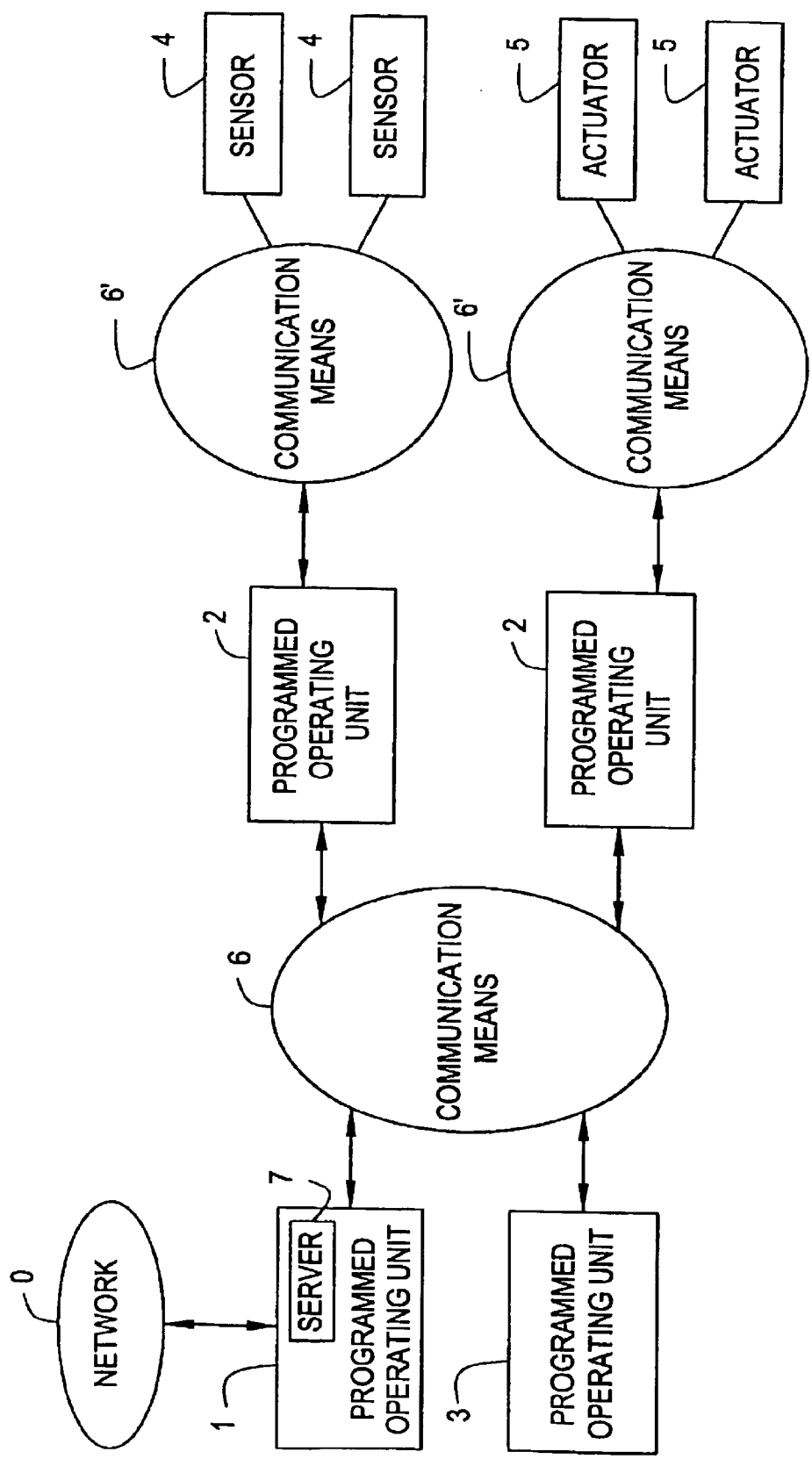
FIG. 1 is a diagram summarizing the principle of a known communications architecture for an industrial system.

The prior art communications architecture that is shown in FIG. 1 is organized to enable information to be interchanged between programmed operating units 1, 2, 3 of an industrial process control system made up of a plurality of monitoring/control devices, including, for example, site devices such as sensors 4 and actuators 5. These devices are controlled by programmed operating units represented in that example by units 2 that are assumed to deliver and/or receive information relating to the operations, in particular control and measurement operations, performed by the devices that they control. The operating units, such as the units 2, communicate as a function of needs firstly with the devices that they control, and secondly with other units of higher level, such as 1 and 3, which are, in particular, assigned the task of supervising the industrial control system. The communications are set up via communications means 6 of the architecture, to which means the various units are connected more or less directly. As developed below, the communications means 6 are conventionally of the industrial local area network type.

Communications means 6' make it possible to connect the monitoring/control devices of the system to the operating units that control them, which communications means are optionally also of the industrial local area network type.

As indicated above, provision is made to implement time shared operation of the links in the communications means 6 and 6' so as to transmit information between the programmed operating units and between said units and the control devices, by enabling the information whose transmission is subjected only to constraints that are relatively flexible as regards urgency to make use of the lapses of time that are left available on a more or less regular basis by the information which is subject to more severe time constraints.

In order to make it possible to access information from outside the system, a server 7 of the HTTP type is provided in a unit of higher level, such as 1, which stores the information that is supplied to it by the other units and by the site devices in order to be able to insert it into HTML-format pages to which access is possible by means of a computer equipped to be able to access such pages. The computer (not shown) is, for example, connected to the unit 1 via a network 0 and for example via the Internet.

A user can thus access information, such as parameters or variables specific to the system, which are stored in the unit 1. The user may optionally supply information to the system, e.g. updating information, in particular if the user has a computer equipped to be able to act as an HTTP server.

As indicated in the preamble of this Application, that solution is not fully satisfactory insofar as all of the information to be accessible in that way must be stored and updated at the unit 1, and insofar as it is possible for that information to be inexact, in particular when information characteristic of a change that has taken place at another unit or at a site device has not yet reached the unit 1 and when the HTML page in which it is to appear is supplied to a requesting user prior to updating. In addition, the use of the unit 1 as a storage intermediary that must be updated continuously induces an incessant information traffic which it is advantageous to avoid in networks that constitute the backbone of the communications means 6 and 6'.

Figure 2:
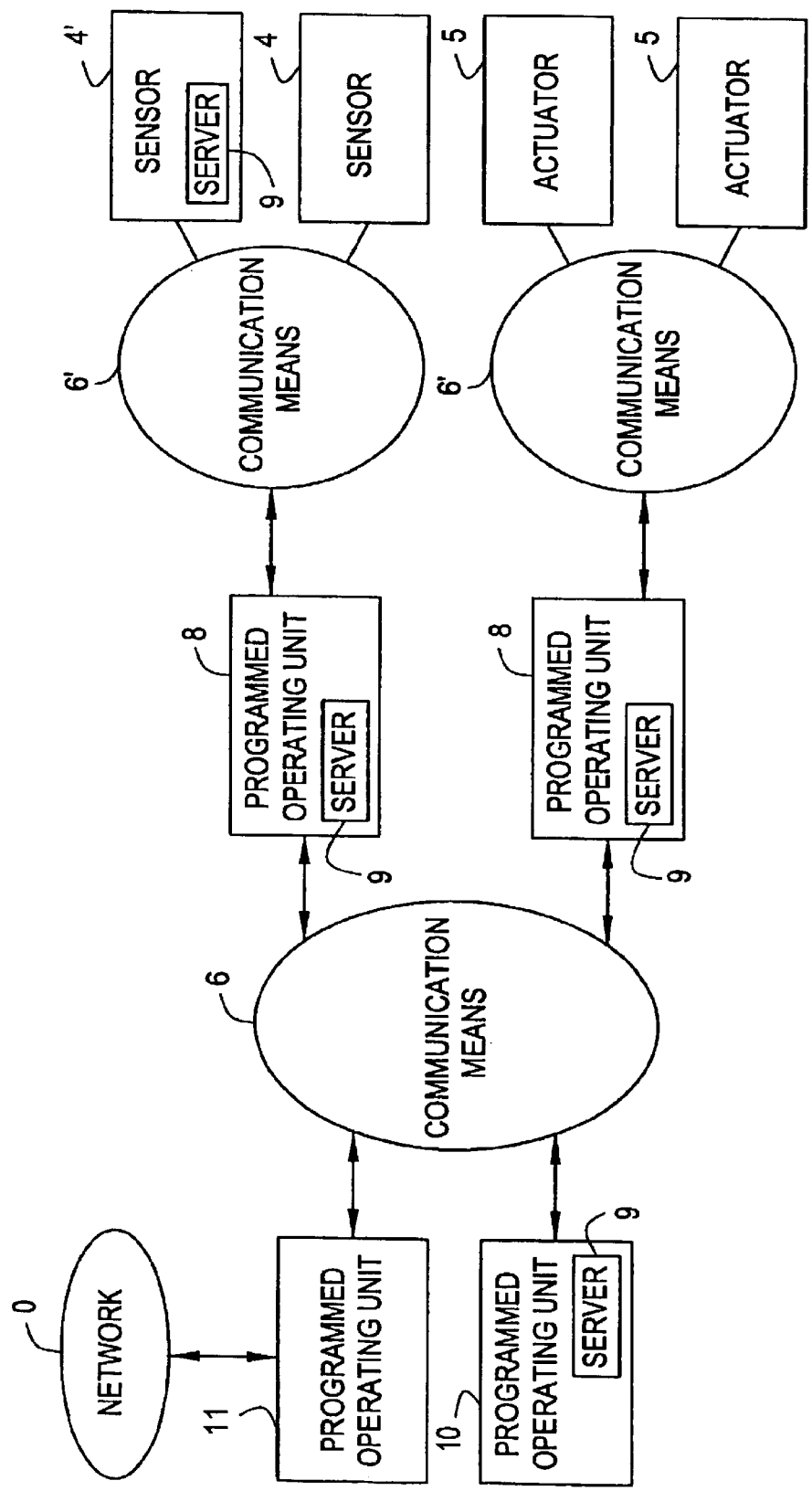
FIG. 2 is a diagram summarizing the principle of a communications architecture of the invention.

The invention therefore proposes to modify the communications architecture of an industrial control system in the manner shown diagrammatically in FIG. 2.

This architecture is designed to provide information interchange between programmed operating units of an industrial process control system that includes a plurality of monitoring/control devices 4, 4', 5 controlled as described above by units that are referenced 8 in this example and that differ from the units 2 by the means with which they communicate with the other units. At least some of the units, and optionally at least some of the monitoring/control devices, such as 4', include a server 9, of the HTTP type. In most cases, this server is relatively rudimentary insofar as, in particular, it does not generally need to include a specific data base for storing the information that it can receive and transmit, in particular when such data is already stored locally.

Such information is taken into account by the server 9 of the unit, which stores it, so that it can then be incorporated into transmitted computer documents that are optionally interactive, e.g. into HTML pages. For example, the information may correspond to modifications in parameters or to changes in variables that are more or less complex.

Naturally, other programmed operating units of the system can be provided with a server 9, of the HTTP type, that is more or less elaborate depending on needs, as symbolized at a higher-level unit 10 which is represented in this example by two units 10 and 11.

The servers 9 have individual addresses of the Internet type which make it possible for a user to have access thereto by means of a suitably-programmed unit of the system or by means of a computer equipped with software and hardware suitable for being capable of behaving like an Internet customer. The customer unit or the computer acting as a customer is put in communication with a server of another unit and in particular a site unit via the set of communications means 6 included in the architecture and optionally via the Internet to which said set of communications means is then connected by a unit acting as a gateway.

To this end, the various programmed operating units of the industrial process control system that include HTTP servers are provided with communications couplers compatible with the HTTP/TCP/IP protocols and services in addition to the standard protocols and services of the local area network(s) used. They are thus capable of transmitting and receiving IP datagrams conveyed by said network(s), without disturbing the deterministic information interchange related to real-time process control.

Figure 3:
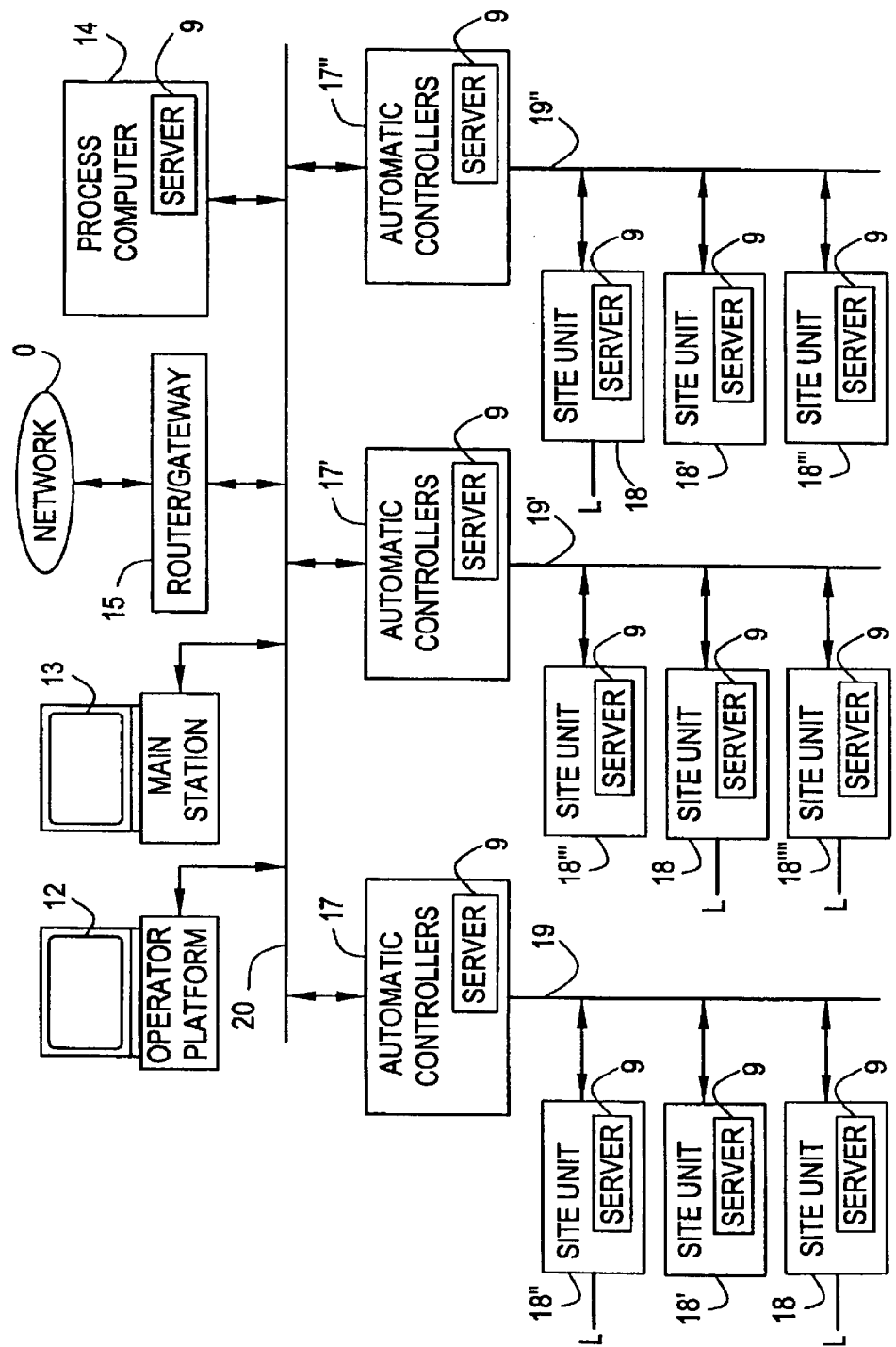
FIG. 3 is a simplified diagram showing an example of a communications architecture of the invention for an industrial control system.

FIG. 3 shows a non-limiting example of an industrial process control system organized on the basis of a modular monitoring-control system for industry, e.g. the Applicant's ALSPA 8000 system. That system includes a plurality of programmed operating units, each of which is conventionally organized around at least one processor, a set of read-only and or read/write memories, and auxiliary equipment such as, in particular, input/output couplers. Such a system incorporates three levels of operational functions corresponding successively to a process supervision and control level, to a process automation intermediate level, and to a process input/output level, in which levels various units are distributed.

The programmed operating units of the process supervision and control higher level are represented in this example by a process supervision and control operator platform 12, a supervision operator main station 13, a process computer 14, a unit 15 serving as a router or as a gateway for communicating with an external computer network 0, e.g. an Intranet or the Internet.

The programmed operating units of the process automation intermediate level are, in this example, represented by automatic controllers 17, 17', 17" which, in this example, are assumed to differ functionally, one being assumed, for example, to host sequential automation applications, another being a programmed power electronics controller, etc. The units may also be organized to be suitable for being used as gateways, which then perform protocol conversions, or as routers between local area networks 19, 19', or 19" and 20 included in the communications architecture.

The site programmed operating units situated at the interface with the process may be of various types. In this example, they are represented by input/output units 18 making it possible to put conventional sensors and/or actuators in communication with a suitable controller for controlling the level of automation of the process, by "intelligent" sensors and/or actuators 18', by units 18" for regulating and monitoring power conversion electrical equipment 18"', by control units 18"" for controlling variable speed drive units, and by operator local stations 18""', etc.

It should naturally be understood that the units mentioned above are indicated merely by way of example, and that the above-indicated number of levels may optionally be reduced by grouping together functions of one level with functions of another level in operating units organized appropriately.

In the example considered, the communications architecture of the industrial process control system is assumed to be made up of deterministic industrial local area networks designed to accommodate both priority deterministic traffic for transmitting variables, and also event-based or "messaging" traffic. For example, the architecture may be based on implementing the standardized WORLDFIP network constituted by the Applicant' s F8000 network.

Through the industrial local area networks, the operating units of the system are connected firstly to one another and optionally to the outside of the system, and secondly to various devices (not shown) in particular for monitoring/controlling the system, and to which certain units are physically connected by links L.

The operating units can be of a wide variety of types, both as regards their natures and their operating modes, and they are not developed herein insofar as they have only an indirect relation to the invention.

In the example considered with reference to FIG. 3, provision is made for the site units 18, 18', 18", 18"', 18"" to be organized in one or more clusters around at least one individual cluster local area network such as 19, 19', or 19", generally referred to as a "site bus". In this example, the cluster network is connected to a programmed operating unit of intermediate level assumed, for example, to be constituted by a controller 17, 17', or 17".

Each of the intermediate units serves, in this example, as a gateway or as a router assigned to putting the cluster site units to which it is connected via one of the cluster networks in communication with the higher-level units to which it is connected via a higher-level industrial local area network 20 commonly referred to as a "cell bus" or as a "control room bus".

The units are individually provided with HTTP servers, and have Internet-type addresses, the communications couplers that they include comply with the HTTP/TCP/IP protocols and services in addition to the standard services and protocols of the industrial local area networks used. The units are thus capable of transmitting and receiving IP datagrams which are, for example, encapsulated in messages conveyed in the context of standard messaging traffic, via the local area networks such as 19 and 20, without disturbing the deterministic traffic for interchanging variables that is conveyed via the networks. The datagrams may also be conveyed in the context of traffic replacing or adding to the standard messaging traffic, without disturbing the deterministic traffic. This thus makes it possible for at least one customer unit to address them so as to cause the information they store to be communicated to it so as to modify some of said information, without disturbing the real-time operation of the control system.

Such access takes place transparently via one of the intermediate units serving as a gateway for the site units of the same cluster. As indicated above, a user can access a server 9 of a unit, via a duly-programmed customer operating unit of the system and more particularly via a higher-level operating unit, through local area networks 19, 20, and through one of the intermediate units. The user can act from a customer unit constituted, for example, by an operator main station 13, or from a duly-equipped computer of the system or that communicates via the external computer network 0.

A server that receives a request from a unit acting as a customer responds with an optionally-interactive computer document. The customer unit necessarily has an HTTP/TCP/IP protocol stack available so that it can firstly address its request and secondly take into account the information received in the form of a computer document from the server that it has addressed, the information being, for example, included in an HTML page. In particular, this makes it possible to insert or to extract parameters and/or variables, via a server 9, when said information is stored by the site unit that contains said server.

In the system considered herein, the local area network, such as 19, of a cluster of units conveys IP datagrams corresponding firstly to the customer/server requests coming from or via the shared unit, such as 17, to the servers of the units of the cluster, and secondly to the responses from said servers.

As is known, the use of the HTTP protocol makes it possible to reduce the time of use of the resources (process and socket) to a value that is very low because there is no session established between a customer unit and a server, and because the TCP/IP connection is interrupted, as soon as the customer unit has received the HTML document that it has requested of the server. The use of these resources by a customer unit thus always remains of very limited duration, which is particularly advantageous as regards how busy the transmission means included in a communications architecture of industrial facilities are. Naturally, the HTML pages produced at the level of a server of a site unit may contain hypertext links enabling a customer unit to go from one server to another in predetermined manner, if necessary.

What is claimed is:

1. A time-shared communications architecture for communicating digitized information for an industrial process control system, the architecture comprising at least one industrial local area network conveying deterministic traffic between a plurality of programmed operating units which process and store information, the architecture capable of being accessed by a customer computer equipped with a predetermined protocol stack, wherein at least one of the plurality of programmed operating units comprises an embedded local server capable of responding to non-deterministic requests received from another programmed operating unit or from the customer computer, said architecture using time slots left available by the deterministic traffic of the industrial local area network for responding to non-deterministic requests without disturbing priority message traffic related to real time process control.

2. The time-shared communications architecture according to claim 1, further comprising a plurality of programmed site units which comprise at least one cluster and at least one of said programmed site units comprising an embedded local server capable of responding to non-deterministic requests, wherein the at least one cluster comprises a cluster local area network of a bus type specific to the at least one cluster and which connects the at least one cluster to at least one shared programmed unit serving as a gateway or as a router to said industrial local area network.

3. The time-shared communications architecture according to claim 2, further comprising at least one of a process control operation platform, a supervision operation main station or a process computer coupled to said industrial local area network.

4. The time-shared communications architecture according to claim 2, further comprising at least one of a router or a gateway that couples said industrial local area network to an external network.

5. The time-shared communications architecture according to claim 2, wherein said embedded local server is a HTTP server, said HTTP server responding with an optionally interactive computer document if a request is received by said HTTP server.

6. The time-shared communications architecture according to claim 5, wherein said request comprises the insertion or the extraction of parameters or variables stored in said programmed unit that includes said server.

7. The time-shared communications architecture according to claim 1, wherein said predetermined protocol stack is an HTTP/TCP/IP protocol stack.

8. The time-shared communications architecture according to claim 1, wherein said embedded local server is a HTTP server, said HTTP server responding with an optionally interactive computer document if a request is received by said HTTP server.

9. The time-shared communications architecture according to claimed 8, wherein said request comprises the insertion or the extraction of parameters or variables stored in said programmed operating unit that includes said embedded local server.

10. A method of communicating non deterministic digitized information between a unit connected to the Internet using an Internet protocol and at least one programmed operating unit or one programmed site unit of an industrial process control system using a real time data exchange protocol over an industrial process control network, in which digitized information required to control an industrial process is interchanged in real time over said industrial process control network in a deterministic mode, the method comprising:

providing the at least one said programmed unit of said industrial process control system with an Internet protocol server, and using an Internet protocol for interchanging the non deterministic digitized information between said unit connected to the Internet and said at least one programmed unit of said industrial process control system using unused time slots left available over said industrial process control system network by the deterministic interchange mode.

11. The method of communicating information as claimed in claim 10, said method further comprises storing information on said site unit.

12. The method of communicating information as claimed in claim 11, said method further comprises allowing a user to access said stored information through said network, wherein said programmed operating unit is connected to an external network.

13. The method of communicating information as claimed in claim 10, said method further comprises storing information on said programmed operating unit.

14. The method of communicating information as claimed in claim 13, said method further comprises allowing a user to access said stored information through said network, wherein said programmed operating unit is connected to an external network.

* * * * *